United States Patent
Fujimoto

(10) Patent No.: US 9,748,008 B2
(45) Date of Patent: Aug. 29, 2017

(54) NUCLEAR POWER PLANT CONTROL SYSTEM AND NUCLEAR POWER PLANT CONTROL METHOD

(75) Inventor: Hiroshi Fujimoto, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 1175 days.

(21) Appl. No.: 13/877,269

(22) PCT Filed: Sep. 29, 2011

(86) PCT No.: PCT/JP2011/072315
§ 371 (c)(1),
(2), (4) Date: Apr. 1, 2013

(87) PCT Pub. No.: WO2012/046610
PCT Pub. Date: Apr. 12, 2012

(65) Prior Publication Data
US 2013/0182809 A1     Jul. 18, 2013

(30) Foreign Application Priority Data
Oct. 4, 2010   (JP) .................................. 2010-225274

(51) Int. Cl.
*G21C 7/36* (2006.01)
*G21D 3/04* (2006.01)
(Continued)

(52) U.S. Cl.
CPC ............. *G21D 3/04* (2013.01); *G21C 7/36* (2013.01); *G21D 3/00* (2013.01); *G21C 17/00* (2013.01); *Y02E 30/39* (2013.01)

(58) Field of Classification Search
CPC  G21D 3/00; G21D 3/001; G21D 3/04; G21D 3/06; G21D 3/08
See application file for complete search history.

(56) References Cited

U.S. PATENT DOCUMENTS

| 4,832,898 A | 5/1989 | Miranda |
| 4,989,129 A * | 1/1991 | Arita ................. G05B 9/03 376/215 |

FOREIGN PATENT DOCUMENTS

| JP | 62-280690 A | 12/1987 |
| JP | 63-234193 A | 9/1988 |

(Continued)

OTHER PUBLICATIONS

Decision to Grant a Patent dated Jul. 21, 2015, issued in counterpart Japanese Patent Application No. 2010-225274, w/English translation (3 pages).

(Continued)

*Primary Examiner* — Marshall O'Connor
(74) *Attorney, Agent, or Firm* — Westerman, Hattori, Daniels & Adrian, LLP

(57) ABSTRACT

A nuclear power plant control system (3) is provided with detection units (30a to 30d) which detect phenomena that occurs in a nuclear power plant for each of four systems, a trip control device (20) which starts, in the case where a signal that indicates an occurrence of the phenomenon is input from at least a predetermined number of signal lines out of signal lines of two systems, processing corresponding to the phenomenon, and majority circuits (50a and 50b) which are provided for each signal line of the two systems and each output, in the case where the phenomenon is detected by N or more detection units out of the detection units (30a to 30d), a signal that indicates an occurrence of the phenomenon to a corresponding signal line.

1 Claim, 4 Drawing Sheets

(51) Int. Cl.
*G21D 3/00* (2006.01)
*G21C 17/00* (2006.01)

(56) References Cited

FOREIGN PATENT DOCUMENTS

| | | | |
|---|---|---|---|
| JP | 63-252299 A | | 10/1988 |
| JP | 64-070802 A | | 3/1989 |
| JP | 4-052701 A | | 2/1992 |
| JP | 04052701 A | * | 2/1992 |
| JP | 06-027293 A | | 2/1994 |
| JP | 7-049399 A | | 2/1995 |

OTHER PUBLICATIONS

Translation of Written Opinion dated Dec. 13, 2011, issued in corresponding application No. PCT/JP2011/072315.
International Search Report for PCT/JP2011/072315, mailing date of Dec. 13, 2011.
Written Opinion of PCT/JP2011/072315, mailing date of Dec. 13, 2011.
Extended (supplementary) European Search Report dated Jun. 8, 2017, issued in counterpart European Patent Application No. 11830543.2. (7 pages).

* cited by examiner

US 9,748,008 B2

NUCLEAR POWER PLANT CONTROL SYSTEM AND NUCLEAR POWER PLANT CONTROL METHOD

FIELD

The present invention relates to a nuclear power plant control system and a nuclear power plant control method, and particularly relates to a nuclear power plant control system and a nuclear power plant control method capable of achieving high reliability while connecting systems having different multiplicities.

BACKGROUND

A nuclear power plant control system that controls a nuclear power plant includes a plurality of independently operating systems to achieve high reliability (for example, see Patent Literature 1). An example of a configuration of the nuclear power plant control system including a plurality of systems will be described with reference to FIGS. 5 and 6.

FIG. 5 is a diagram illustrating an example of a configuration of a conventional nuclear power plant control system. A nuclear power plant control system 1 illustrated in FIG. 5 is a control system that controls a nuclear reactor trip, and includes a duplex channel and a duplex train. Herein, a channel is a system that detects a phenomenon occurring in a nuclear power plant, and a train is a system that performs a logical operation based on a detection result of the channel.

In the nuclear power plant control system 1, a detection unit 10a included in a channel I includes a sensor that detects a specific phenomenon (for example, a rise in pressure in a particular part and the like) occurring in the nuclear power plant, and a threshold operation unit that performs a threshold operation of a detected value of the sensor. When a detected value of the sensor exceeds a threshold, the detection unit 10a outputs a signal that indicates an occurrence of a specific phenomenon to an input unit 21a included in a train A.

A detection unit 10b included in a channel II includes a sensor and a threshold operation unit similar to those of the detection unit 10a, and outputs a signal that indicates an occurrence of a specific phenomenon to an input unit 21b included in a train B when a detected value of the sensor exceeds a threshold.

A trip control device 20 including the input unit 21a and the input unit 21b trips a nuclear reactor when a signal is input to at least one of the input unit 21a and the input unit 21b. By such a configuration, the nuclear power plant control system 1 may maintain a function even when a malfunction occurs in a portion of the channel or the train.

FIG. 6 is a diagram illustrating an example of a configuration of a recent nuclear power plant control system. A nuclear power plant control system 2 illustrated in FIG. 6 is a control system that controls a nuclear reactor trip, and includes a quadruple channel of a channel I to a channel IV. A channel I includes a detection unit 30a and an input unit 41a. A channel II includes a detection unit 30b and an input unit 41b. A channel III includes a detection unit 30c and an input unit 41c. A channel IV includes a detection unit 30d and an input unit 41d.

In the nuclear power plant control system 2, the respective detection units 30a to 30d include a sensor that detects a specific phenomenon occurring in a nuclear power plant, and a threshold operation unit that performs a threshold operation of a detected value of the sensor. When a detected value of the sensor exceeds a threshold, the detection units 30a to 30d output a signal that indicates an occurrence of a specific phenomenon to an input unit 41 included in the same channel.

A trip control device 40 including input units 41a to 41d trips a nuclear reactor when a signal is input to at least two of the input units 41a to 41d. By such a configuration, the nuclear power plant control system 2 may maintain a function even when a malfunction occurs in a portion of the channel.

CITATION LIST

Patent Literature

Patent Literature 1: Japanese Patent Application Laid-open No. 6-27293

SUMMARY

Technical Problem

As previously described, a nuclear power plant control system includes a plurality of systems, and a multiplicity varies according to a system. In general, a recent system has a high multiplicity. For this reason, when a portion of an existing nuclear power plant control system is to be replaced by a recent equipment to improve a function and the like, a simple replacement of the equipment may not respond since a multiplicity is different.

For example, the detection units 10a and 10b illustrated in FIG. 5 are to be replaced by the detection units 30a to 30d illustrated in FIG. 6, these may not be simply connected since the input units 21a and 21b are a duplex unit while the detection units 30a to 30d are a quadruple unit. In addition, when systems having different multiplicities are inappropriately connected to each other, redundancy is lost, and reliability which is significant for a nuclear power plant control system may be degraded.

The invention is conceived in view of the above, and an object of the invention is to provide a nuclear power plant control system and a nuclear power plant control method capable of achieving high reliability while connecting systems having different multiplicities to each other.

Solution to Problem

According to an aspect of the present invention, a nuclear power plant control system includes: detection units that detect a phenomenon occurring in a nuclear power plant for each of M systems; a start unit that starts processing corresponding to the phenomenon in a case where a signal that indicates an occurrence of the phenomenon is input from a predetermined number or more of signal lines out of L signal lines; and a majority circuit, provided for each of the L signal lines, each of which outputting a signal that indicates an occurrence of the phenomenon to a corresponding signal line in a case where the phenomenon is detected in N or more systems out of the M systems of the detection units. L is an integer greater than or equal to 1, M is an integer greater than or equal to 2, and N is an integer greater than or equal to 1.

The nuclear power plant control system includes majority circuits corresponding to systems of a connection destination on a one-to-one basis, and each majority circuit outputs a signal to the connection destination in response to a detection status at a connection source. Accordingly, it is possible to achieve high reliability while connecting systems having different multiplicities to each other.

Advantageously, in the nuclear power plant control system, the majority circuit is combined with a relay or a breaker provided for each of the M systems.

In this aspect, since the majority circuit is combined with the relay or the breaker which is a device that reliability is verified, reliability of the majority circuit may be ensured.

Advantageously, in the nuclear power plant control system, the relay or the breaker is multiplexed for each of the M systems.

In this aspect, reliability of the majority circuit may be enhanced by multiplexing the relay or the breaker.

According to another aspect of the present invention, a nuclear power plant control method of controlling a transmission of a signal between detection units that detect a phenomenon occurring in a nuclear power plant for each of M systems and a start unit that starts processing corresponding to the phenomenon in a case where a signal that indicates an occurrence of the phenomenon is input from a predetermined number or more of signal lines out of L signal lines, includes: receiving, by a majority circuit provided for each of the L signal lines, a signal that indicates whether the phenomenon is detected from each of the M systems, and outputting, by the majority circuit, a signal that indicates an occurrence of the phenomenon to a corresponding signal line in a case where a signal indicating that the phenomenon is detected is received from N or more systems out of the M systems. L is an integer greater than or equal to 1, M is an integer greater than or equal to 2, and N is an integer greater than or equal to 1.

In the nuclear power plant control method, majority circuits corresponding to systems of a connection destination on a one-to-one basis are provided, and each majority circuit outputs a signal to the connection destination in response to a detection status at a connection source. Accordingly, it is possible to achieve high reliability while connecting systems having different multiplicities to each other.

Advantageous Effects of Invention

The nuclear power plant control system and the nuclear power plant control method according to the invention have an effect of achieving high reliability while connecting systems having different multiplicities to each other.

DESCRIPTION OF EMBODIMENTS

Hereinafter, Embodiment of a nuclear power plant control system and a nuclear power plant control method according to the invention will be described in detail based on drawings. It should be noted that the invention is not limited to the Embodiment. In addition, components in the Embodiment contain the equivalent including a component easily assumed by those skilled in the art, and the substantially same component.

Embodiment

Figure 1:
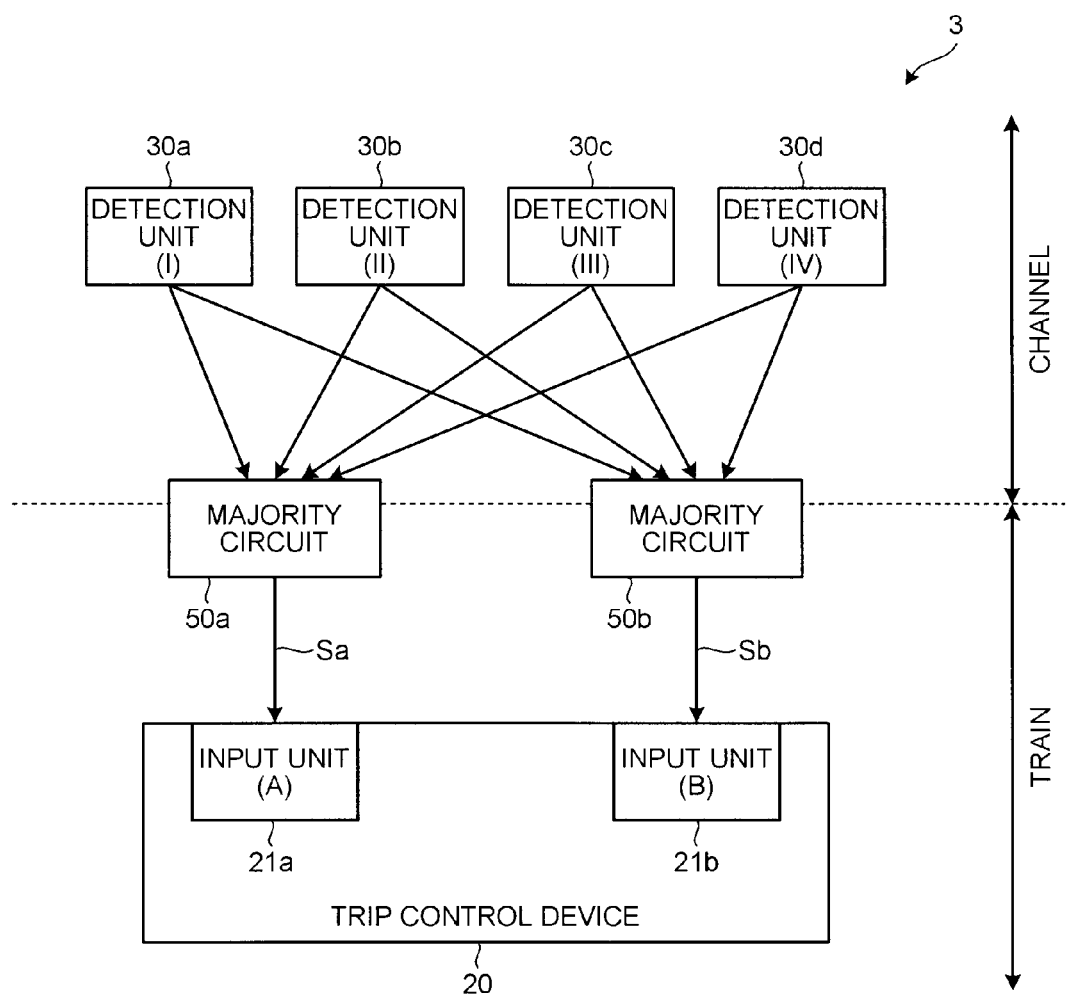
FIG. 1 is a diagram illustrating a schematic configuration of a nuclear power plant control system according to the Embodiment.

First, a configuration of a nuclear power plant control system according to the Embodiment will be described with reference to FIG. 1. FIG. 1 is a diagram illustrating a schematic configuration of a nuclear power plant control system according to the Embodiment. A nuclear power plant control system 3 illustrated in FIG. 1 is a control system that controls a nuclear reactor trip, and includes detection units 30a to 30d, a trip control device 20, and majority circuits 50a and 50b.

Figure 5:
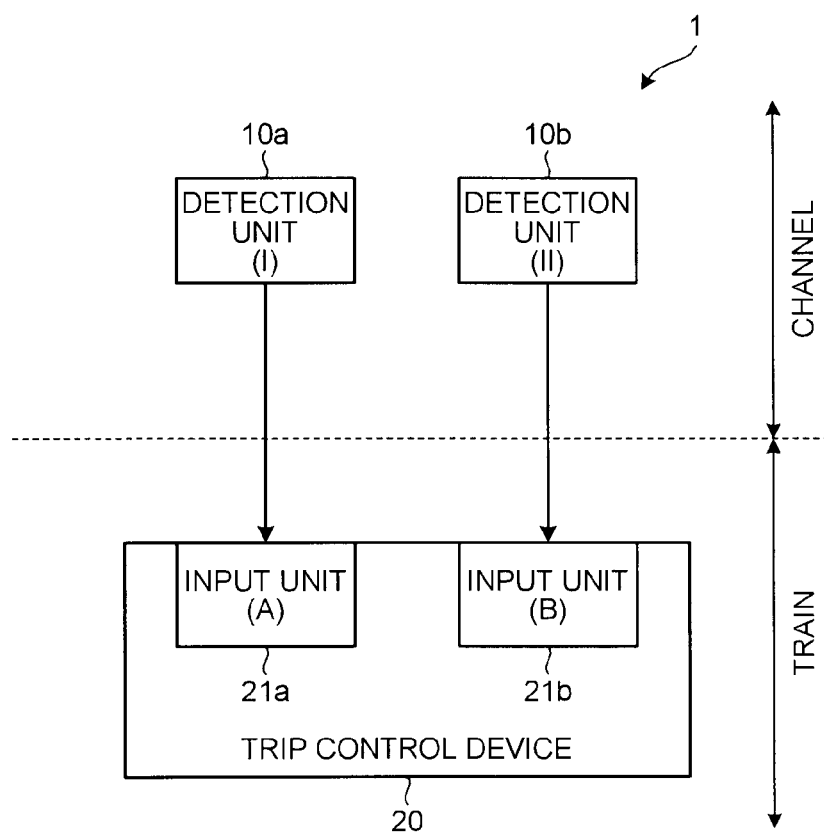
FIG. 5 is a diagram illustrating an example of a configuration of a conventional nuclear power plant control system.
Figure 6:
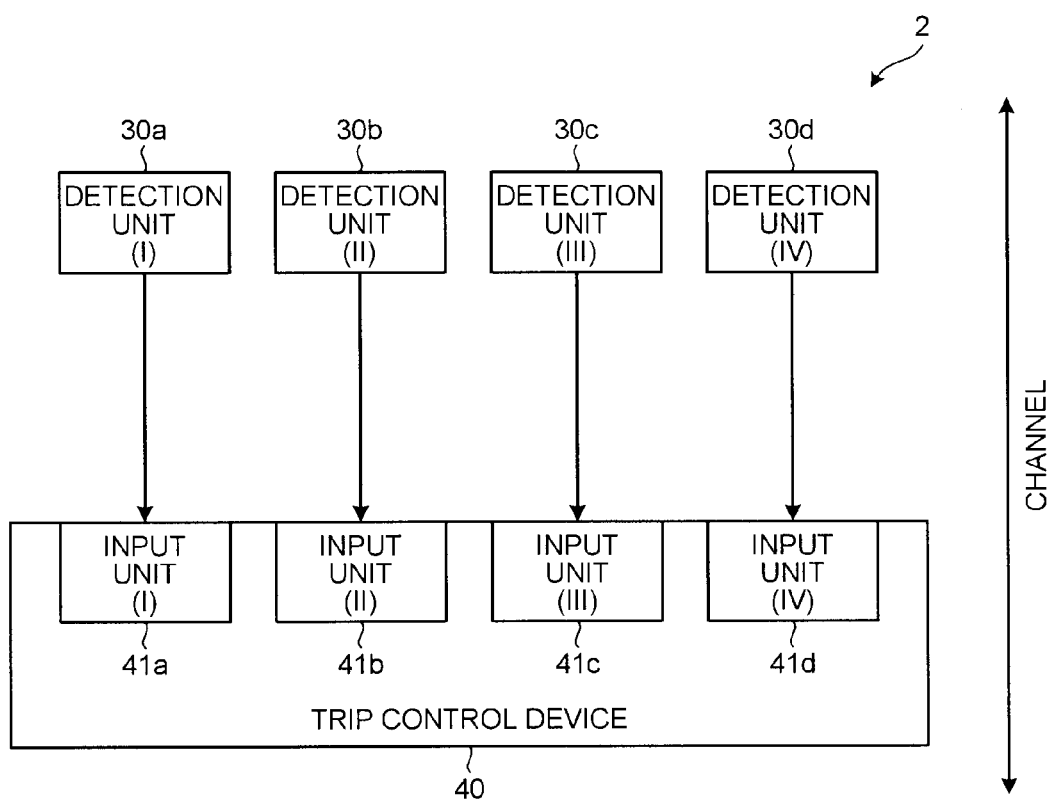
FIG. 6 is a diagram illustrating an example of a configuration of a recent nuclear power plant control system.

Similarly to the detection units 30a to 30d illustrated in FIG. 6, the respective detection units 30a to 30d include a sensor that detects a specific phenomenon occurring in a nuclear power plant, and a threshold operation unit that performs a threshold operation of a detected value of the sensor, and output a signal that indicates an occurrence of a specific phenomenon when a detected value of the sensor exceeds a threshold. Similarly to the trip control device 20 illustrated in FIG. 5, the trip control device 20 includes an input unit 21a and an input unit 21b, and trips a nuclear reactor when a signal that indicates an occurrence of a specific phenomenon is input to at least one of the input unit 21a and the input unit 21b.

In this way, the nuclear power plant control system 3 includes a quadruple channel and a duplex train.

The majority circuits 50a and 50b connect the quadruple channel to the duplex train. Specifically, the majority circuit 50a is connected to the respective detection units 30a to 30d, and outputs a signal that indicates an occurrence of a specific phenomenon to the input unit 21a through a signal line Sa when the signal that indicates an occurrence of a specific phenomenon is input from at least two of the detection units 30a to 30d. In addition, the majority circuit 50b is connected to the respective detection units 30a to 30d, and outputs a signal that indicates an occurrence of a specific phenomenon to the input unit 21b through a signal line Sb when the signal that indicates an occurrence of a specific phenomenon is input from at least two of the detection units 30a to 30d.

To connect the quadruple channel to the duplex train, for example, a first channel and a second channel may be connected to a first train via an OR circuit, and a third channel and a fourth channel may be connected to a second train via an OR circuit. However, in this case, when one of the OR circuits breaks down, or a function is suspended to conduct a test, a detection result in a channel connected to the OR circuit is not reflected on a control, and reliability is significantly degraded.

In addition, to connect the quadruple channel to the duplex train, for example, all channels may be connected to the first train via an OR circuit, and all channels may be connected to the second train via an OR circuit. However, in this case, when one channel merely erroneously outputs a signal, processing of a nuclear reactor trip and the like is erroneously executed even when the other channels normally operate.

As illustrated in FIG. 1, when majority circuits and trains are connected to each other on a one-to-one basis by providing the same number of the majority circuits as that of the trains, and outputs of all channels are input to the respective majority circuits, it is possible to connect channels and trains having different multiplicities to each other while retaining high reliability.

Next, an operation and a configuration of the majority circuits 50a and 50b illustrated in FIG. 1 will be described in detail with reference to FIGS. 2 to 4. The majority circuits 50a and 50b have similar configurations. Thus, hereinafter, the operation and the configuration will be described using the majority circuit 50a as an example.

Figure 2:
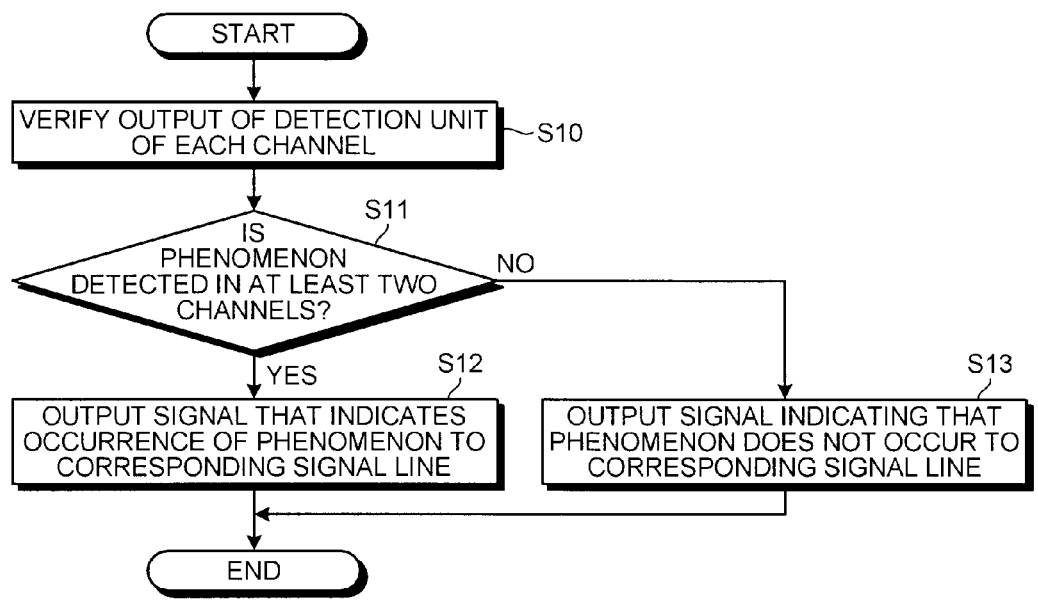
FIG. 2 is a flowchart illustrating an operation of a majority circuit.

FIG. 2 is a flowchart illustrating an operation of the majority circuit 50a. The majority circuit 50a executes the operation illustrated in FIG. 2 at predetermined intervals. As illustrated in FIG. 2, in step S10, the majority circuit 50a verifies an output of a detection unit 30 of each channel. Then, when an occurrence of a specific phenomenon is detected in the detection units 30 of at least two channels (Yes in step S11), the majority circuit 50a outputs a signal that indicates the occurrence of a specific phenomenon (for example, "1") to the input unit 21a via the signal line Sa in step S12.

On the other hand, when an occurrence of a specific phenomenon is not detected in the detection units 30 of at least two channels (No in step S11), the majority circuit 50a outputs a signal indicating that the specific phenomenon does not occur (for example, "0") to the input unit 21a via the signal line Sa in step S13.

Figure 3:
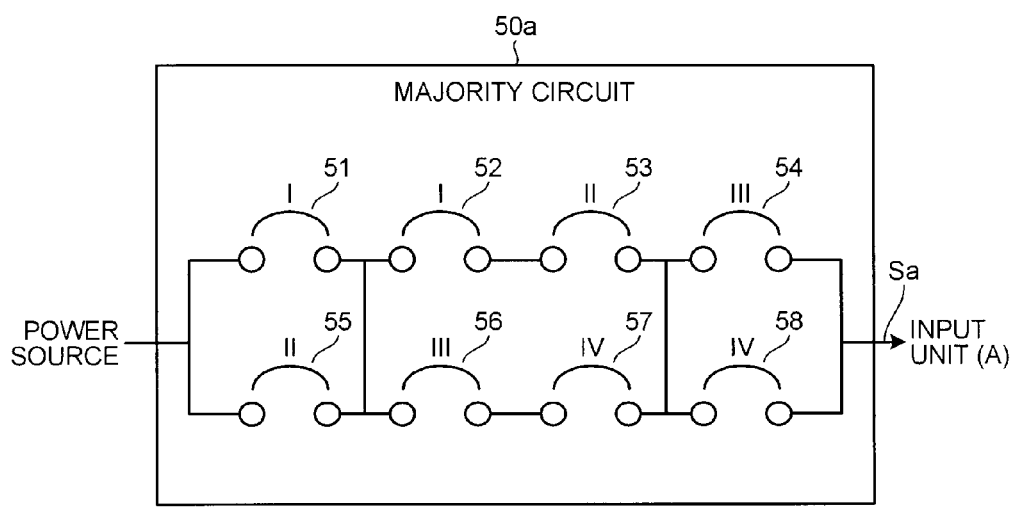
FIG. 3 is a diagram illustrating an example of a configuration of the majority circuit.
Figure 4:
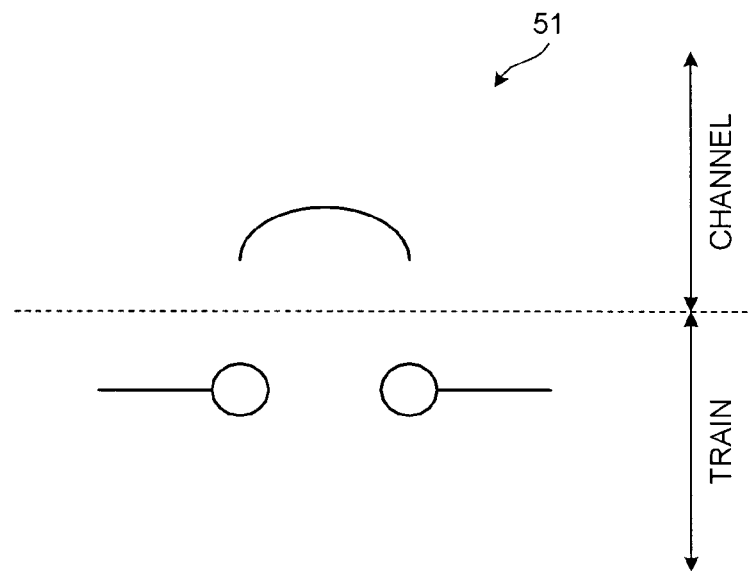
FIG. 4 is a diagram illustrating an example of a separation of a channel and a train.

FIG. 3 is a diagram illustrating an example of a configuration of the majority circuit 50a. In the example illustrated in FIG. 3, the majority circuit 50a includes relays 51 and 52 operating based on a signal received from the channel I, relays 53 and 55 operating based on a signal received from the channel II, relays 54 and 56 operating based on a signal received from the channel III, and relays 57 and 58 operating based on a signal received from the channel IV.

In this way, when the majority circuit 50a is combined with a relay which has been used for a long time, and is a device that reliability is verified, reliability of the majority circuit 50a may be ensured. In addition, by using the relay, as illustrated in FIG. 4, the channel and the train may be physically separated from each other in a portion of a contact point. When the channel and the train are desired to be separated from each other to ensure safety, it is important to physically separate the channel and the train from each other. The majority circuits 50a and 50b may be combined with a breaker which is a device that reliability is verified similarly to the relay.

As described in the foregoing, in the Embodiment, since the majority circuits 50a and 50b are provided, it is possible to achieve a nuclear power plant control system having high reliability while connecting the channel and the train having different multiplicities to each other.

The configuration of the nuclear power plant control system described in the above Embodiment may be arbitrarily changed without departing from the scope of the invention. For example, in the above Embodiment, the nuclear power plant control system that performs a control of a nuclear reactor trip is given as an example. However, the invention is effective for a control system that performs another control.

In addition, a multiplicity of each unit of the nuclear power plant control system described in the above Embodiment may be arbitrarily changed according to a desired degree of reliability and the like. Specifically, when detection means (corresponding to the detection units 30a to 30d) that detect a phenomenon occurring in a nuclear power plant for each of M systems are connected to a start means (corresponding to the trip control device 20) that starts processing corresponding to the phenomenon in a case where a signal that indicates an occurrence of the phenomenon is input from a predetermined number or more of signal lines out of L signal lines, a majority circuit may be provided for each of the L signal lines, and each majority circuit may output a signal that indicates an occurrence of the phenomenon to a corresponding signal line in a case where the phenomenon is detected in N or more systems out of the M systems of the detection means. However, L is an integer greater than or equal to 1, M is an integer greater than or equal to 2, and N is an integer greater than or equal to 1.

REFERENCE SIGNS LIST 1 to 3 NUCLEAR POWER PLANT CONTROL SYSTEM
10a, 10b DETECTION UNIT
20 TRIP CONTROL DEVICE
21a, 21b INPUT UNIT
30a to 30d DETECTION UNIT
40 TRIP CONTROL DEVICE
41a to 41d INPUT UNIT
50a, 50b MAJORITY CIRCUIT
51 to 58 RELAY

The invention claimed is:

1. A control method of a control system of a nuclear power plant including M detection units that detect a phenomenon occurring in a nuclear power plant for each of M systems and a start unit that starts processing corresponding to the phenomenon in a case where a signal that indicates an occurrence of the phenomenon is input from a predetermined number or more of signal lines out of L signal lines, for controlling a transmission of a signal between the M detection units and the start unit, the method comprising:
   providing a plurality of majority circuits as many as the L signal lines such that each of the plurality of majority circuits is connected to each of the signal lines one by one and all outputs from the M detection units are inputted to each of the plurality of majority circuits;
   receiving, by the majority circuit provided for each of the L signal lines, a signal that indicates whether the phenomenon is detected from all of the M systems, and
   outputting, by the majority circuit, a signal that indicates an occurrence of the phenomenon to a corresponding signal line in a case where a signal indicating that the phenomenon is detected is received from N or more systems out of the M systems,
   wherein L is an integer greater than or equal to 1, M is an integer greater than or equal to 2 being larger than L, and N is an integer greater than or equal to 1.

* * * * *